Aug. 18, 1936. A. A. HERZBERG ET AL Re. 20,068

UNIVERSAL MULTIPLE DRILL HEAD

Original Filed Oct. 8, 1931 9 Sheets-Sheet 1

Inventors:
Anton A. Herzberg,
Henry O. Schultz, and
John S. Tumpak.
By: Brown, Jackson, Boettcher & Dienner
Attys.

Aug. 18, 1936. A. A. HERZBERG ET AL Re. 20,068

UNIVERSAL MULTIPLE DRILL HEAD

Original Filed Oct. 8, 1931 9 Sheets-Sheet 2

Inventors:
Anton A. Herzberg,
Henry O. Schutte, and
John S. Tumpak.

By: Brown, Jackson, Boettcher & Dienner
Attys.

Aug. 18, 1936. A. A. HERZBERG ET AL Re. 20,068

UNIVERSAL MULTIPLE DRILL HEAD

Original Filed Oct. 8, 1931 9 Sheets-Sheet 3

Inventors:
Anton A. Herzberg,
Henry O. Schultz, and
John S. Tumpak.

By: Brown, Jackson, Boettcher, Dienner & Co.

Aug. 18, 1936. A. A. HERZBERG ET AL Re. 20,068

UNIVERSAL MULTIPLE DRILL HEAD

Original Filed Oct. 8, 1931 9 Sheets-Sheet 4

Inventors:
Anton A. Herzberg,
Henry O. Schultz, and
John S. Tumpak.

By: Brown, Jackson, Boettcher & Dienner
Attys.

UNIVERSAL MULTIPLE DRILL HEAD

Original Filed Oct. 8, 1931 9 Sheets-Sheet 5

Inventors:
Anton A. Herzberg,
Henry O. Schultz, and
John S. Tumpak.

By: Brown, Jackson, Boettcher & Dienner
Attys.

UNIVERSAL MULTIPLE DRILL HEAD

Original Filed Oct. 8, 1931 9 Sheets-Sheet 6

Inventors:
Anton A. Herzberg,
Henry O. Schultz, and
John S. Tumpak.

By: Brown, Jackson, Boettcher & Dienner
Attys.

Inventors:
Anton A. Herzberg,
Henry O. Schultz, and
John S. Tumpak.

By: Brown, Jackson, Boettcher & Dienner
Attys.

Inventors:
Anton A. Herzberg,
Henry O. Schultz, and
John S. Tumpak.

By: Brown, Jackson, Boettcher & Dienner
Attys.

UNIVERSAL MULTIPLE DRILL HEAD

Original Filed Oct. 8, 1931 9 Sheets-Sheet 9

Inventors:
Anton A. Herzberg,
Henry O. Schultz, and
John S. Tumpak.

By: Brown, Jackson, Boettcher & Dienner
Attys.

Reissued Aug. 18, 1936

Re. 20,068

UNITED STATES PATENT OFFICE 20,068

UNIVERSAL MULTIPLE DRILL HEAD

Anton A. Herzberg, Waukesha, and Henry O. Schultz and John S. Tumpak, Milwaukee, Wis., assignors to Waukesha Universal Drill Head Company, Milwaukee, Wis.

Original No. 1,967,307, dated July 24, 1934, Serial No. 567,554, October 8, 1931. Application for reissue June 1, 1936, Serial No. 82,942

10 Claims. (Cl. 77—22)

This invention relates to multiple drill heads, and more particularly to what we term a universal multiple drill head, which drill head permits of an unlimited number of variations in the arrangement of the drill spindles within the scope of the head.

Multiple drill heads are extensively used in commercial plants for drilling a plurality of openings or recesses in various articles. It is the common practice to provide a pattern plate upon which the drill spindles are arranged according to the openings or recesses to be drilled, after which the head is built up with suitable gearing arranged to accord with the arrangement of the spindles for driving the latter. This means that for each job it is necessary to construct a new drill head, which is a time consuming and expensive operation.

In order to avoid the necessity of constructing a new drill head for each job, it has been proposed to provide universal joint drives for the spindles with a view to allowing some latitude in the arrangement thereof. This has proved to be unsatisfactory, and in many instances altogether impractical, since the universal drives restrict the extent to which the spindles can be adjusted to meet varying conditions. A further objection to the universal joint drives for the spindles is that such joints are mechanically weak and are not well adapted to withstand the severe stresses to which they are unavoidably subjected in use, while such joints also introduce an objectionable amount of friction. It is the usual practice in drives of this type to provide connecting spindles between the driving members and the driven members, which is objectionable in that such connecting spindles make it extremely difficult and frequently impossible to make close center-to-center set ups.

One of the main objects of our invention is to provide a drill head comprising means whereby a positive transmission of power through gears to the gear spindles is assured, the spindles being rigid and free of universal joints or equivalent flexible connections. A further object is to provide a head of this character embodying a plurality of take-off gears and spindle assemblies so related that a positive drive from the gears to the spindles is assured in any position of the latter relative to the former within the scope of the head. An additional object of our invention is to provide a multiple drill head in which the take-off gears are so disposed that the spindles may be driven therefrom in any arrangement of the spindles within the scope of the head, it only being necessary to provide a new spindle support for each job, the spindles being arranged thereon in accordance with the pattern of the particular job, all necessity for constructing the gearing in accordance with the particular job being eliminated, thus effecting a material saving in adapting the head for any given job. Further objects and advantages of our invention will appear from the detailed description.

Figure 1:
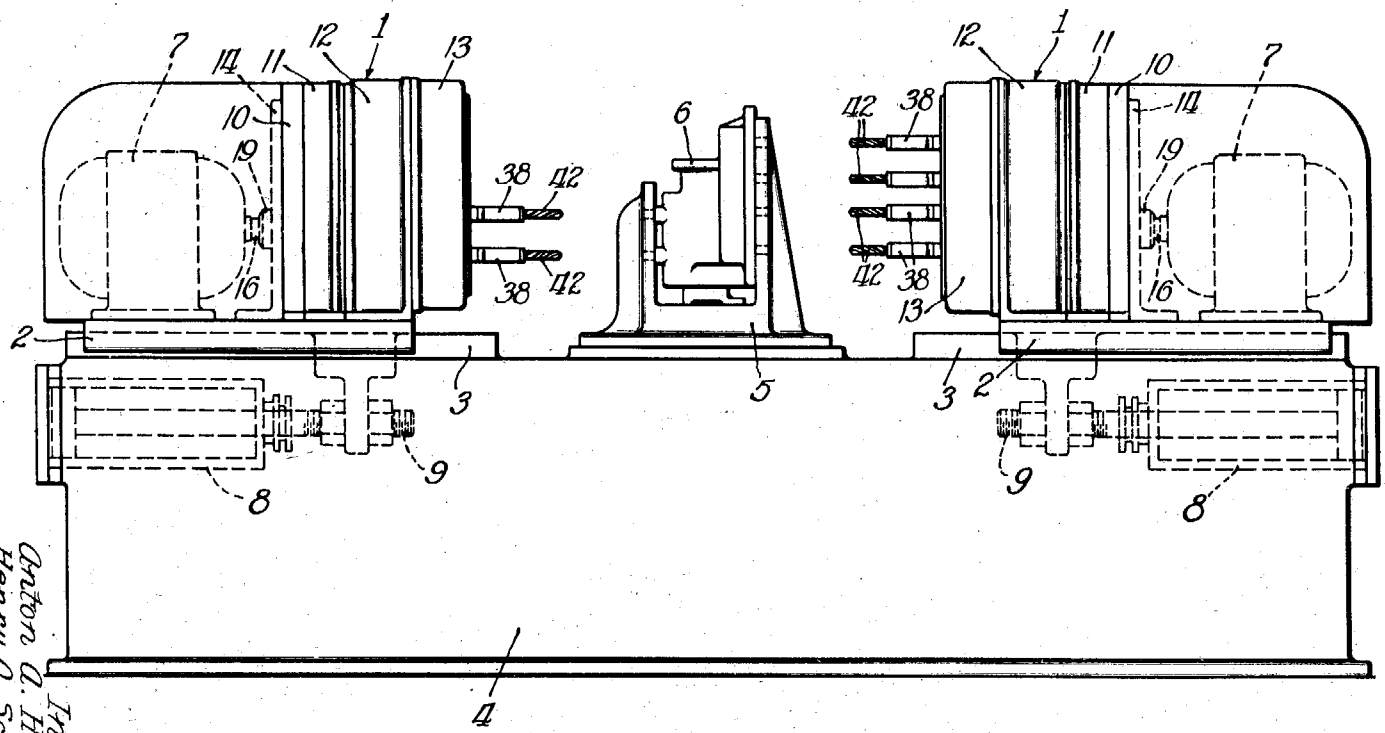
Figure 1 is a side view of a two-way drilling machine illustrating two drill heads in accordance with our invention as applied thereto.

In Figure 1 of the drawings we have illustrated, by way of example, two drill heads 1, constructed in accordance with our invention, as applied to a two-way drilling machine. Each of these heads is mounted upon a base 2 which has dovetail connection with a bed plate 3 mounted upon frame 4 of the machine. The drill heads are disposed at opposite sides of a jig 5 suitably mounted upon the machine, this jig holding the work piece 6 in a known manner. An electric motor 7 has driving connections with each of the drill heads, this motor being mounted upon base plate 2. The drill heads are moved toward and away from the work in any suitable or preferred manner, as by means of hydraulic cylinders 8 in which operate pistons, the rods 9 of which are suitably connected to base plates 1 for moving the same, and the parts carried thereby, lengthwise of bed plate 3 in either direction desired. In practice, one or more drill heads may be employed, and any suitable or preferred means may be provided for causing relative movement between the drill head and the work in proper direction, as conditions may require.

Figure 2:
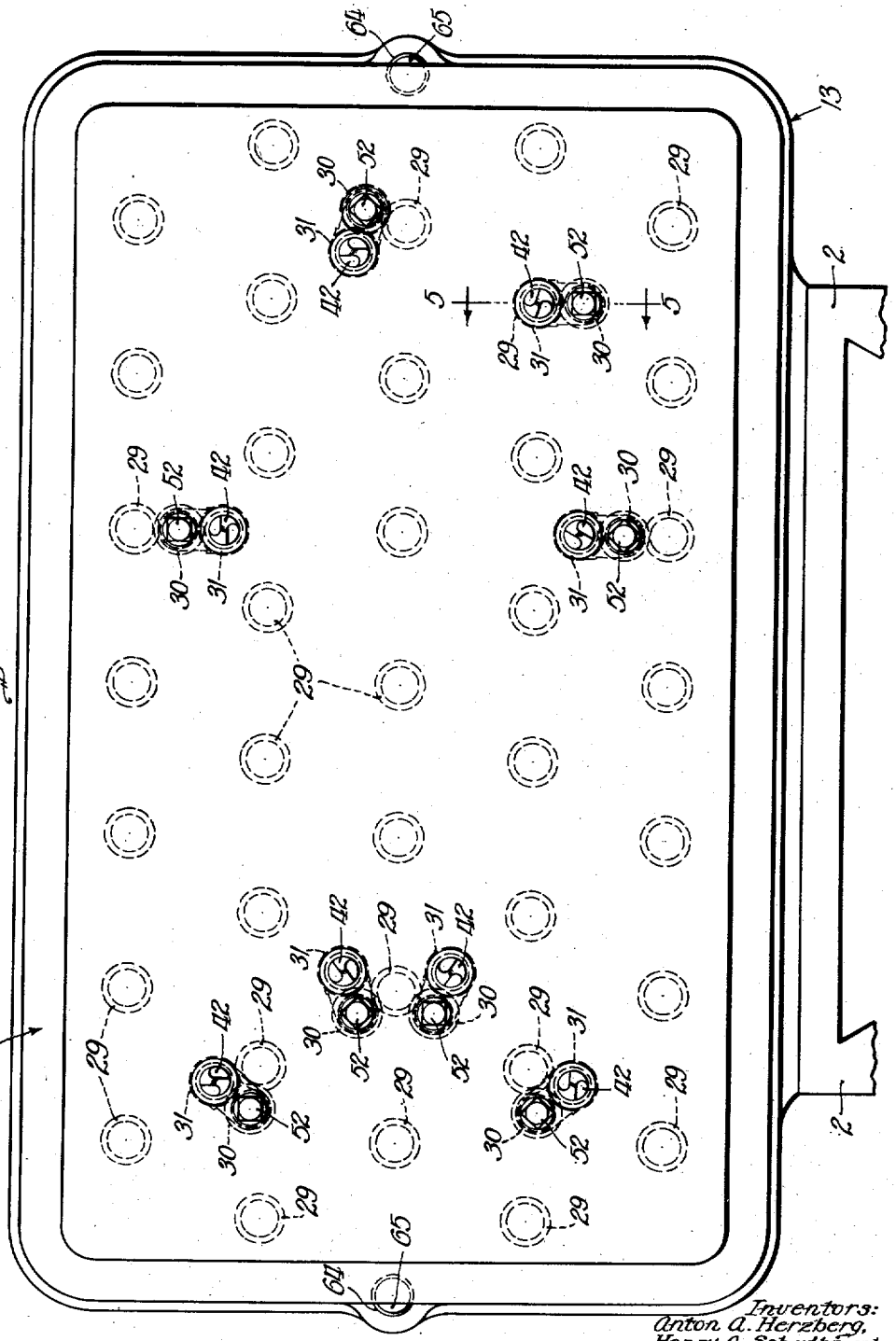
Figure 2 is an inner end or face view of the drill head of our invention with a plurality of spindle assemblies and associated drills mounted thereon.
Figure 3:
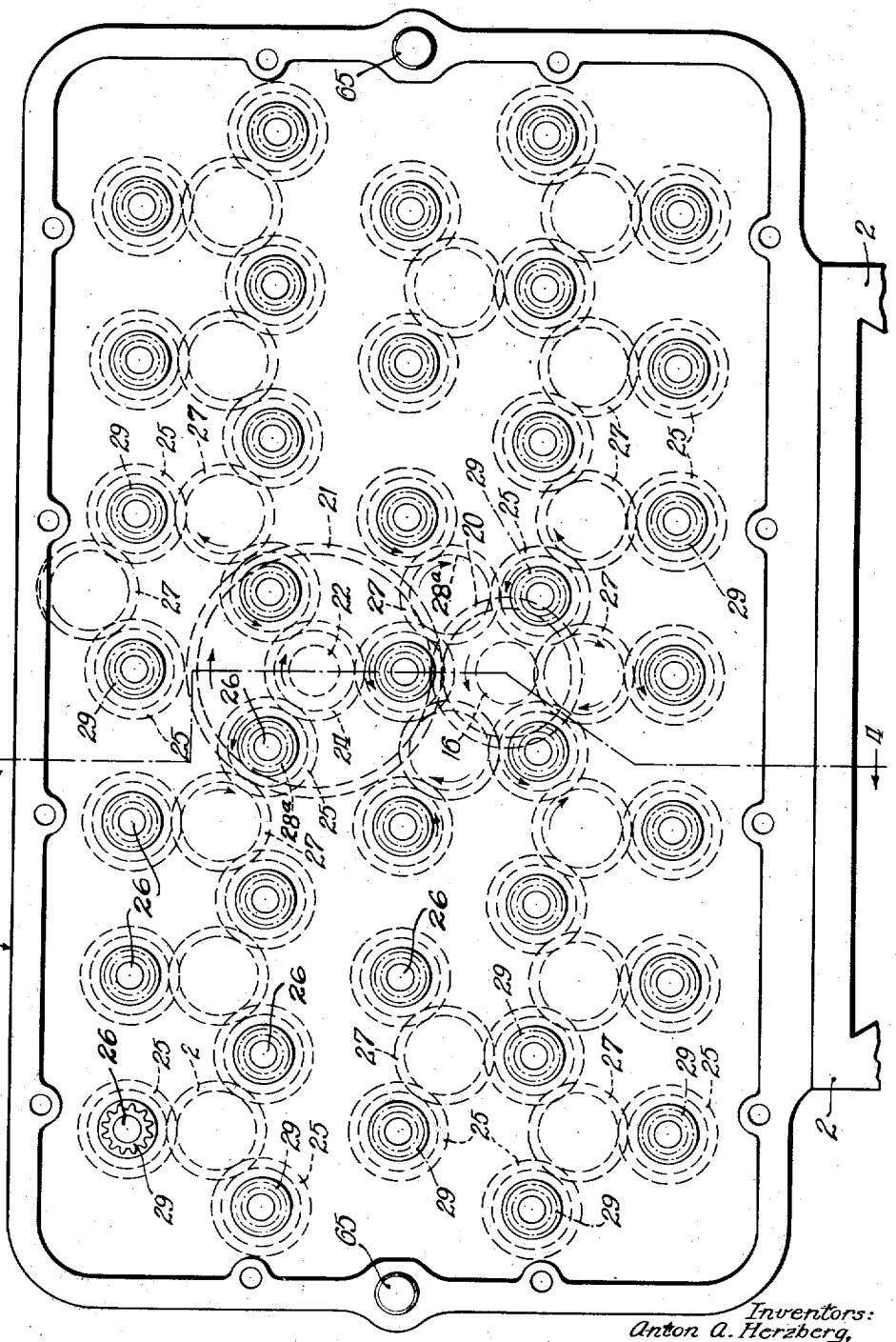
Figure 3 is a view similar to Figure 2, but with the spindle assembly supporting structure removed to disclose the take-off gears.
Figure 4:
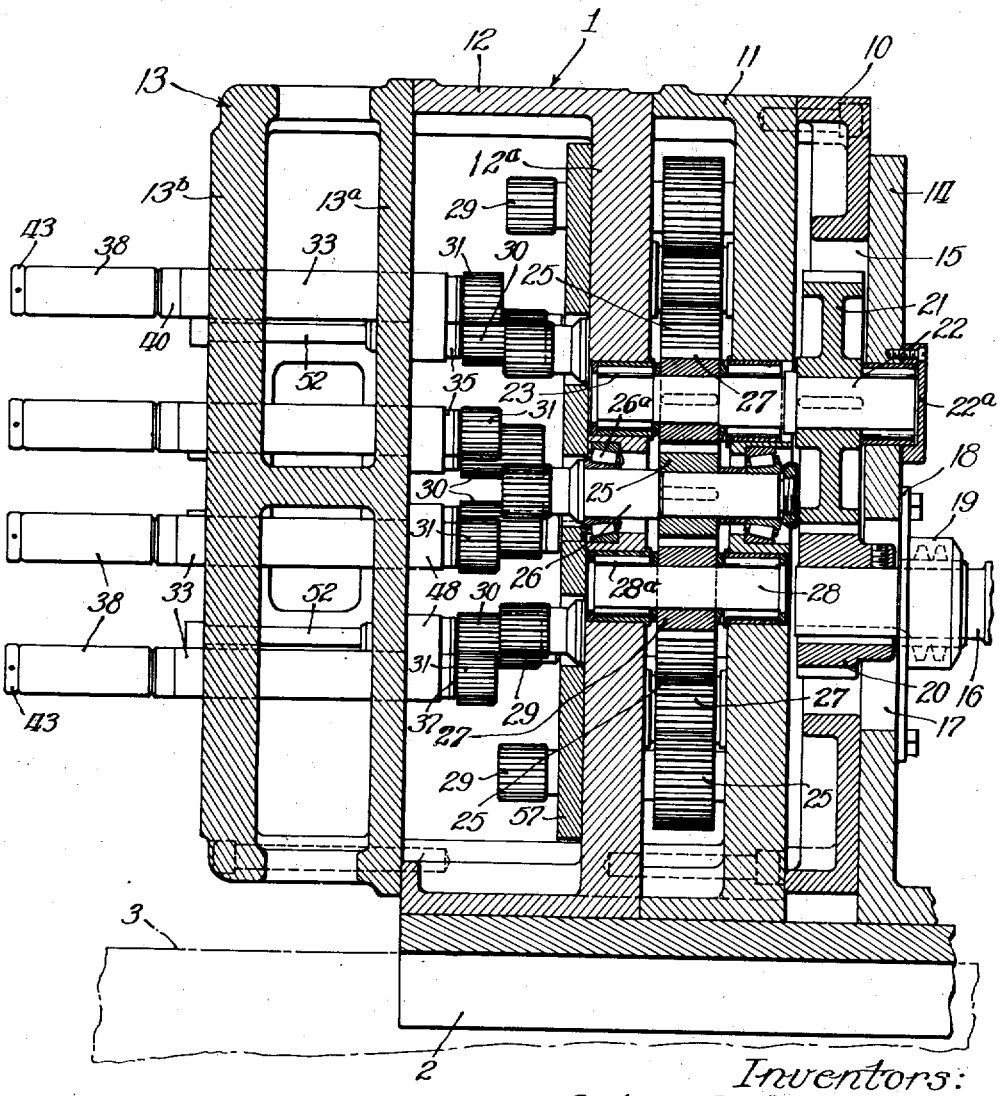
Figure 4 is a section taken substantially on line 4—4 of Fig. 3, but with the spindle assembly supporting structure and the associated spindle assemblies in place.

Referring more particularly to Figure 4, the head comprises three box-like sections 10, 11, and 12 which increase in depth toward the front of the head, these sections being bolted or otherwise suitably secured together in abutting relation. A spindle assembly supporting structure 13 is bolted or otherwise suitably secured to the front of section 12 and provides a closure therefor. The sections 10, 11 and 12, and the structure 13 are shown as of rectangular shape in front view, as in Figures 2 and 3, but these members may be of any suitable or preferred shape and, while we preferably provide a sectional casing for the head, as shown in Figure 4, any suitable or preferred type of casing may be employed.

A back plate 14 is bolted or otherwise suitably secured to section 10 and provides a closure for an opening 15 through the back thereof. A main drive shaft 16, which may be the shaft of motor 7, extends through an opening 17 through plate 14, this opening being closed by a sealing plate 18, conveniently bolted to plate 14, this sealing plate carrying a stuffing box or oil seal 19 of suitable type through which the shaft 16 passes. A spur pinion 20 is keyed upon the inner or forward end of shaft 16 and meshes with a spur gear 21 disposed in the upper portion of opening 15 and keyed upon a countershaft 22 which extends through plate 14 and the outer or back walls of sections 11 and 12. The countershaft 22 is mounted in suitable anti-friction bearings, such as roller bearings 23 of known type, disposed in plate 14 and the outer or back walls of sections 11 and 12 of the casing. A sealing cap 22a is secured to the outer face of plate 14 and encloses the outer end of countershaft 22 and the associated bearings to provide an oil seal thereabout.

A primary drive pinion 24 is keyed on countershaft 22 within the casing section 11. This pinion meshes with pinions 25, disposed within the casing section 11 and keyed upon stub shafts 26 rotatably mounted through the back walls of casing sections 11 and 12, in suitable anti-friction bearings such as the roller bearings 26a of known type. As will be noted more clearly from Figure 3, three stub shafts 26 are disposed about the countershaft 22 equidistant therefrom, and each of these stub shafts has a pinion 25 keyed thereon and meshing with the primary drive pinion 24. The pinions 25 which are keyed on the stub shafts 26 mesh with similar pinions 27 keyed on stub shafts 28 mounted in roller bearings 28a mounted in the back walls of casing sections 11 and 12. These pinions 27 also mesh with pinions 25 keyed upon adjacent stub shafts 26. The stub shafts 26 project through the back wall or gear plate 12a of casing section 12 and extend forwardly thereof. A take-off gear or driving member 29 is suitably secured upon the forward end of each of the stub shafts 26. As will be noted more clearly from Figure 3, there are a plurality of stub shafts 26 distributed throughout the entire area of gear plate 12a and these stub shafts are all driven from the primary pinion 29, either directly or through the intermeshing pinions 25 and 27, the pinions being so related that the stub shafts 26 are all driven in the same direction.

The stub shafts 26 are so related that the take-off gears 29 are disposed in predetermined geometric arrangement. In the preferred form of our invention illustrated in Figure 3, the take-off gears 29 are arranged to form a series of contiguous and equilateral triangles, the distance between any two adjacent gears being uniform throughout the series. In laying out the arrangement of the take-off gears in equilateral triangle pattern, the spacing of the centers of the take-off gears or the side of a triangle depends upon the pitch diameters of the gears 29 and 31 and pinion 30. The relation between the size of the triangle and the pitch diameters is such that a take-off gear 29 can be operatively connected by an intermediate pinion 30 to a spindle gear 31 located at the center of the triangle. If the pitch diameters of the gears and pinion are adequate for this location of the spindle, then it is clear that a spindle can be located anywhere within the triangle and operatively connected to at least one of the take-off gears 29 defining that triangle.

Figure 8:
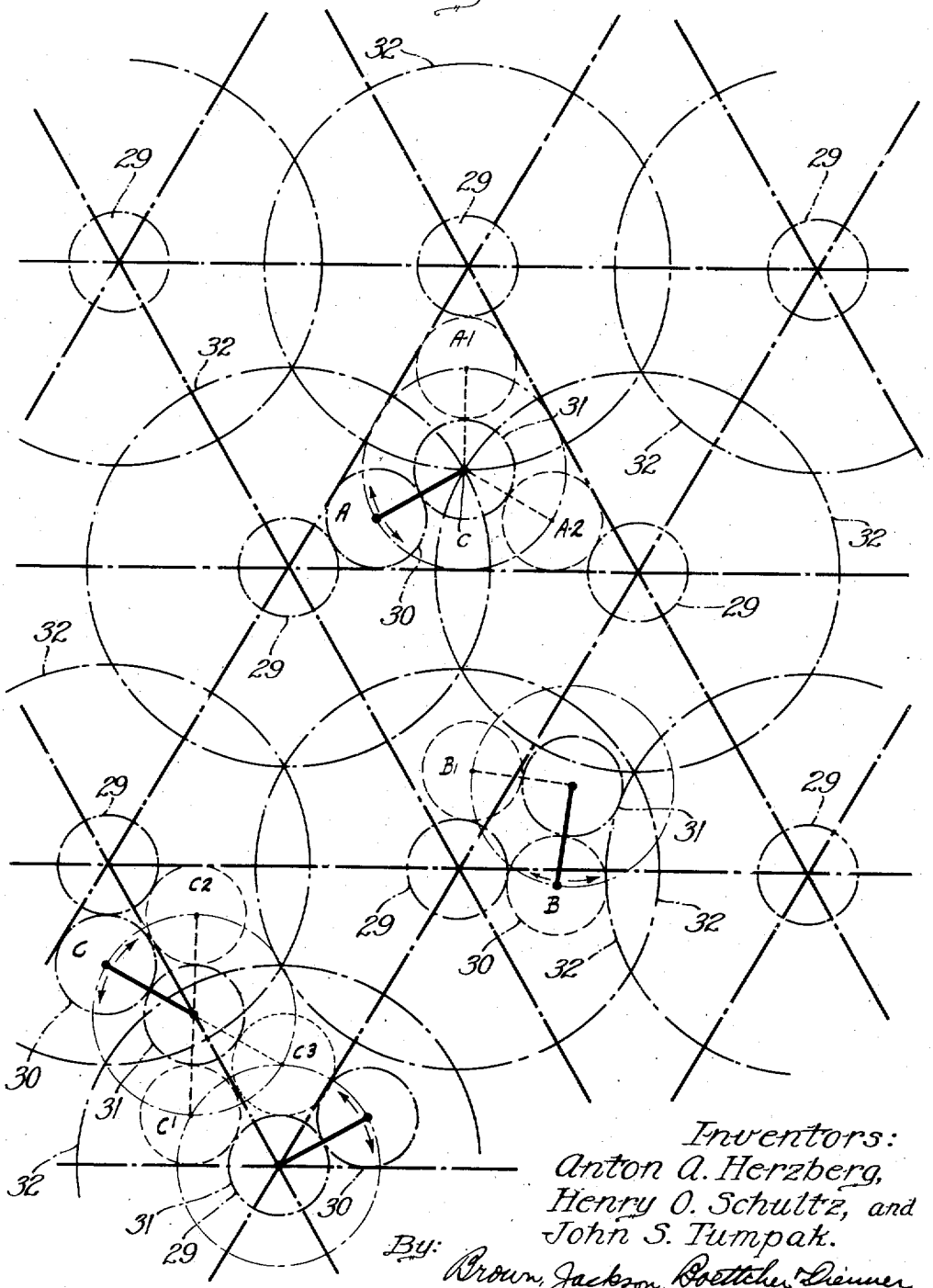
Figure 8 is a diagram illustrating the arrangement of the take-off gears and some of the various possible positions of the spindle idler pinion in mesh with the take-off gears.
Figure 9:
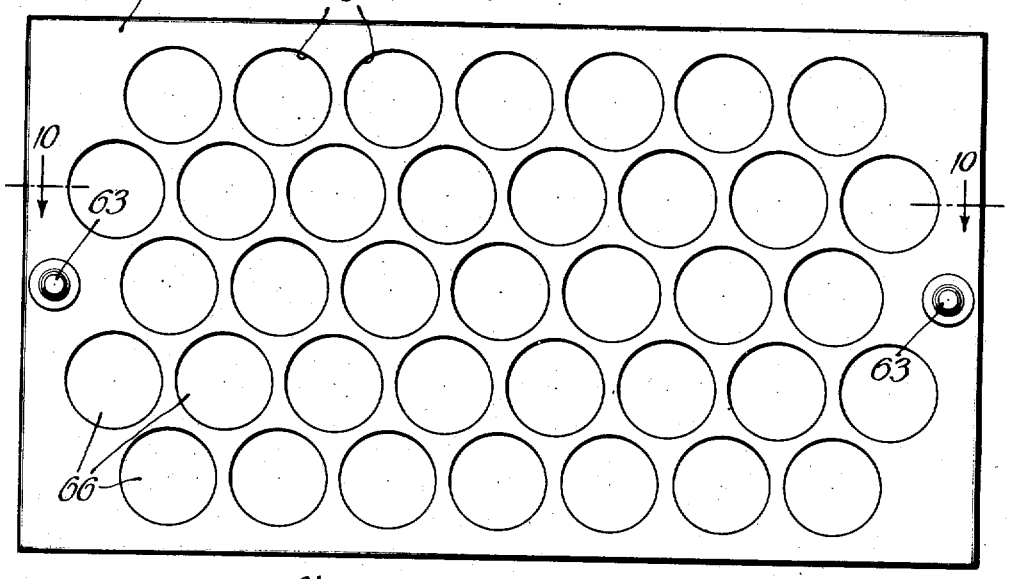
Figure 9 is an outer face view of the template for positioning the spindle idler pinions.
Figure 10:
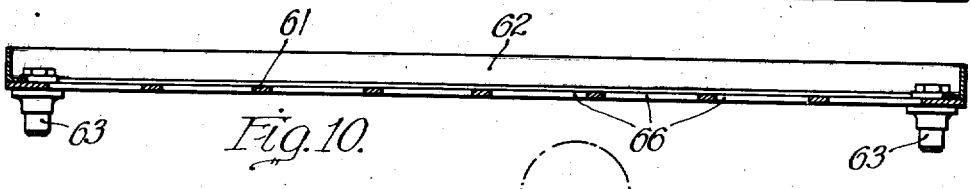
Figure 10 is a section taken substantially on line 10—10 of Figure 9.

Referring to the upper portion of Figure 8, it will be noted that we have shown a spindle gear 31 located at the center $c$ of the triangle defined by three take-off gears 29. The gear 31 may be connected to any one of the gears 29 by means of a pinion 30. In this case the centers of the gears 29 and 31 and pinion 30 are in a straight line. It will be noted that the distance from an angle to the center of the circle is $$\tfrac{1}{2}D_T+D_I+\tfrac{1}{2}D_S$$

where $D_T$ is the pitch diameter of the take-off gear 29, $D_I$ is the pitch diameter of the pinion 30 and $D_S$ is the pitch diameter of the spindle gear 31. Consequently, the side of the triangle is $$\sqrt{3}\left(\frac{1}{2}D_T+D_I+\frac{1}{2}D_S\right)$$

$$0.866D_T+1.732D_I+0.866D_S$$

and the distance between the pitch circles of the take-off gears along the side of a triangle is $$\sqrt{3}D_I+\frac{\sqrt{3}}{2}D_S-(1-\sqrt{3})D_T$$

or $$1.732D_I+0.866D_S-0.134D_T$$

If, as is shown in Figure 8, the diameters $D_T$, $D_I$ and $D_S$ are equal the distance from an angle to a center is $2D_T$, the side of the triangle is $2\sqrt{3}\,D_T$ or 3.464 $D_T$ and the distance between the pitch circles of the take-off gears along the side of a triangle is 2.464 $D_T$. It will be understood that the triangle may be made smaller than indicated by these dimensions, but if it is made larger there will be an area around the center *c* in which a spindle cannot be centered.

In Figure 8 we have indicated an idler pinion 30 and a spindle gear 31 in mesh with the pinion, the pitch circles only of this pinion and gear being indicated, pinion 30 and gear 31 being of the same pitch diameter as the take-off gears 29 so that the distance between the axis of spindle gear 31 and the most remote point on the pitch circle of pinion 30 is equal to one and one-half times the pitch diameter of the take-off gears 29. If the spindle gear 31 be so disposed that its axis coincides with the center point *c* of the triangle, pinion 30 may be positioned to mesh with any one of the three take-off gears 29 as indicated by the positions A, A1, and A2 of idler pinion 30. Obviously, if the axis of spindle gear 31 falls at any point within the triangle other than the center point thereof, the pinion 30 may be moved into mesh with at least one of the take-off gears 29. If the axis of spindle gear 31 falls upon any side of the triangle, and at the center point of such side, pinion 30 may be moved into mesh with either of the two take-off gears 29 at the ends of the side of the triangle. If the axis of spindle gear 31 falls upon any side of the triangle and at any point thereof other than the center point, the pinion 30 can be moved into mesh with the nearer one of the two take-off gears 29 at the ends of such side. Since the take-off gears 29 are uniformly spaced, and the equilateral triangles defined by such gears are contiguous, it follows that a pinion adjustable on an axis spaced from the most remote point of the pitch circle of such pinion a distance equal to one and one-half times the pitch diameter of the respective take-off gears, can be disposed to mesh with a selected one of the take-off gears in any position of such axis relative to the take-off gears.

With further reference to Figure 8, the circle 32 concentric with the respective take-off gears 29 and of a radius equal to one and one-half times the pitch diameter of such take-off gear, may be considered as defining the effective area of this gear with relation to the idler pinion 30 and the spindle gear 31. Since this circle passes through the axis of spindle gear 31, it is obvious that if the axis of this spindle gear falls at any point on the circle 32, the idler pinion 30 may be disposed to mesh with the corresponding take-off gear 29. In Figure 8, the circles 32 described about the take-off gears 29 defining the central triangle of this figure, intersect at the center point *c* of the triangle. It follows, therefore, as previously noted that when the axis of spindle gear 31 coincides with the center point of the triangle, the pinion 30 may be positioned to mesh with any one of the three take-off gears defining such triangle. If the axis of the spindle gear falls within the circle 32 defining the effective area of any one of the take-off gears 29, the idler pinion may be disposed to mesh with the corresponding take-off gear at either side thereof, as indicated by the positions B and B1 of the idler pinion at the lower central portion of Figure 8. It will be noted that the circles defining the effective areas of the respective take-off gears overlap. If the axis of spindle gear 31 falls at any point within the area of overlap of the circles defining the effective areas of two adjacent take-off gears, the idler pinion 30 can be positioned to mesh with either one of these two adjacent take-off gears at either side thereof. At the lower left hand portion of Figure 8 we have shown the spindle gear 31 disposed with the axis thereof at the center point of the area of overlap between two adjacent circles of two adjacent take-off gears. As indicated, the idler pinion 30 may occupy any one of the four positions C, C2, C3 or C1, in any one of which positions it will mesh with either one or the other of the two adjacent take-off gears. It follows, therefore, that if the axis of the spindle gear 31 falls at any point within the area of overlap of the two circles, the idler pinion may be disposed to mesh with either one of the two adjacent take-off gears at either side thereof.

The spindle assembly supporting structure 13 provides a pattern plate for supporting the spindle assemblies in predetermined relation to accord with the work to be done. This structure or pattern plate is first laid off and marked to indicate the proper disposition of the spindles thereon, after which it is suitably bored for reception of the spindle assemblies. Each spindle assembly includes a bearing sleeve 33 which fits snugly through aligned openings in the plate or structure 13. Suitable bushings 34 and 35, provided at their outer ends with outwardly projecting flanges, are disposed on the ends of sleeve 33. A spindle 36 is rotatably mounted through the bushings, and spindle gear 31 is keyed upon the inner end of this spindle, this gear contacting a washer 37 confined between the gear and the flange at the inner end of bushing 35. Preferably the gear 31 is secured against endwise movement on the spindle by a taper pin 38. The spindle is provided at its outer end with an enlarged socket 38 the rearward end of which abuts a ring 39 of a thrust ball bearing assembly 40 of suitable type which seats against the outer end of sleeve 33. Spindle 36 is thus mounted for free rotation and is effectively held against endwise movement. The socket 38 receives a drill chuck 41 of known type having a tapered bore for reception of the tapered shank of a suitable drill 42. An adjusting ring 43 screws onto the chuck 41 and bears against the outer end of socket 38 for adjusting the chuck lengthwise in the socket to vary the effective length of the drill as conditions may require. A key 44, suitably secured in the socket member 38, projects into a groove 45 extending lengthwise of the chuck and serves to hold the latter against turning movement in the socket. A set screw 46, threaded through the wall of the socket 38, projects into a groove 47 extending from the outer end of the chuck 41 and terminating a short distance inwardly of the threaded portion of the chuck, to normally prevent complete withdrawal of the chuck from the socket.

Sleeve 33 is provided, at its inner end, with a radially projecting arm 48 which contacts the inner face of the pattern plate. This arm is provided with a bore which registers with a corresponding bore through inner wall 13*a* of plate 13. The aligned bores of arm 48 and plate 13*a* receive an enlarged hub 49 at the outer end of a stud shaft 50, there being a shoulder 51 at the inner end of the hub, which shoulder contacts the inner face of arm 48. Hub 49 is suitably bored and threaded from its outer end for reception of a securing bolt 52 which passes through an opening 53 in outer wall 13*b* of plate 13, this opening 53 being concentric with hub 49. The head of bolt 52 bears upon a lock washer 54 which bears against the outer face of plate 13. The bolt 52, in conjunction with the stud shaft and arm 48, provides means for effectively securing sleeve 33 in position and for holding this sleeve against endwise movement.

Figure 5:
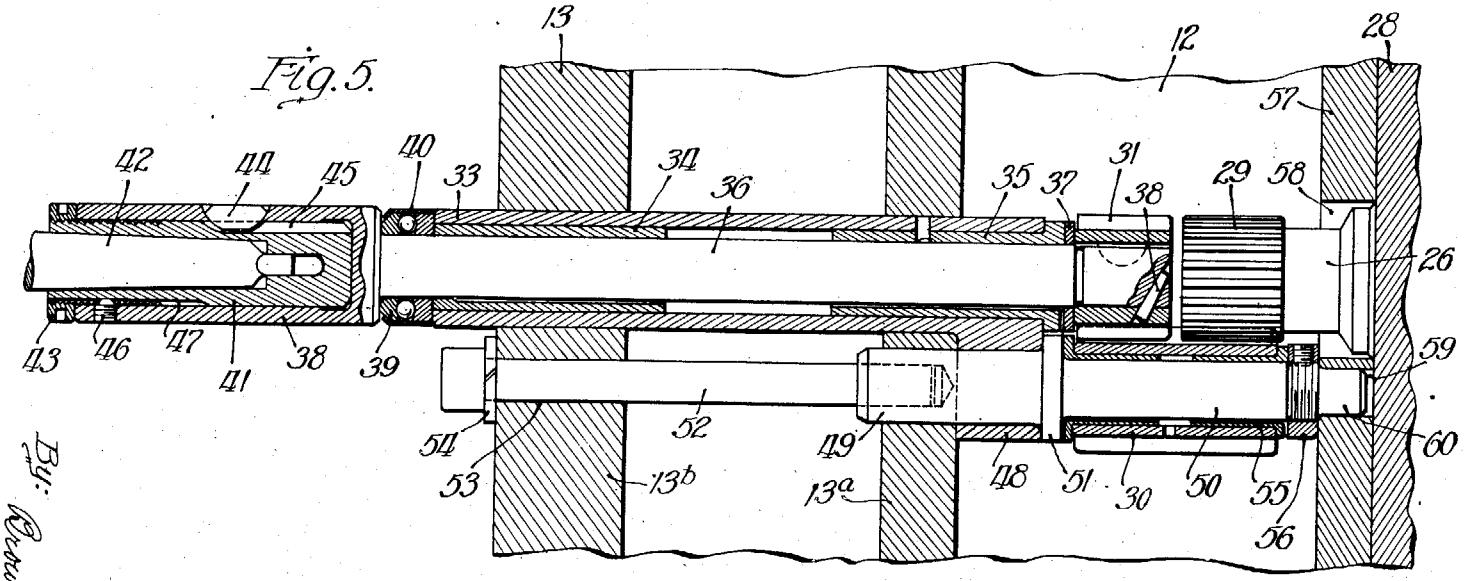
Figure 5 is a longitudinal sectional view through one of the spindle assemblies and associated parts, on an enlarged scale, parts being shown in elevation.

Idler pinion 30 is rotatably mounted upon suitable bushings 55 disposed above the stud shaft 50, each of these bushings having an outwardly extending flange at its outer end. A stop collar 56 is suitably secured upon stud shaft 50 adjacent the inner end thereof and contacts the flange of the inner bushing 55, this collar and the bushings cooperating to hold pinion 32 against endwise movement on the stud shaft. The pinion 32 meshes with spindle gear 31, this pinion and the spindle gear being of the same pitch diameter as the take-off gear 29. In Figure 5 the spindle 36 is shown as disposed coaxially with the stub shaft 26, and the pinion 32 meshes with gear 29 of such stub shaft 26. Preferably, a pilot plate 57 is bolted, or otherwise suitably secured to gear plate 28 at the forward or outer face thereof. This pilot plate is provided with opening 58 disposed to accommodate the shafts 26, and with pilot openings 59 disposed to receive studs 60 at the inner ends of the stud shafts 50. The studs 60 fit snugly into the openings 59, plate 57 serving to hold the inner ends of shafts 50 against undesirable movement so as to maintain the pinions 32 in proper mesh with the cooperating take-off gears 29.

It occasionally happens that a spindle 30 is disposed coaxially with one of the stub shafts 26, as in Figure 5, though it will be found that, as a general rule, the spindles are disposed eccentric to the stub shafts. In order to locate the pinions 32 of the respective spindle assemblies so as to assure proper mesh of the pinions with the take-off gears, we provide a template and jig such as those illustrated in Figures 9 to 13. The template comprises a rectangular plate 61 and a reenforcing angle frame 62 therefor, this frame being riveted or otherwise suitably secured to the plate. A guide stud 63 is suitably secured to each side of the template, centrally thereof, these stubs being adapted to enter corresponding openings 64 provided at the center of each side of plate 13 so as to accurately position the template relative thereto. When plate 13 is in operative position upon the drill head, the openings 64 receive guide studs 65 at the center of each side of casing section 12 and projecting forwardly therefrom, such studs positioning plate 13 accurately relative to section 12.

Figure 11:
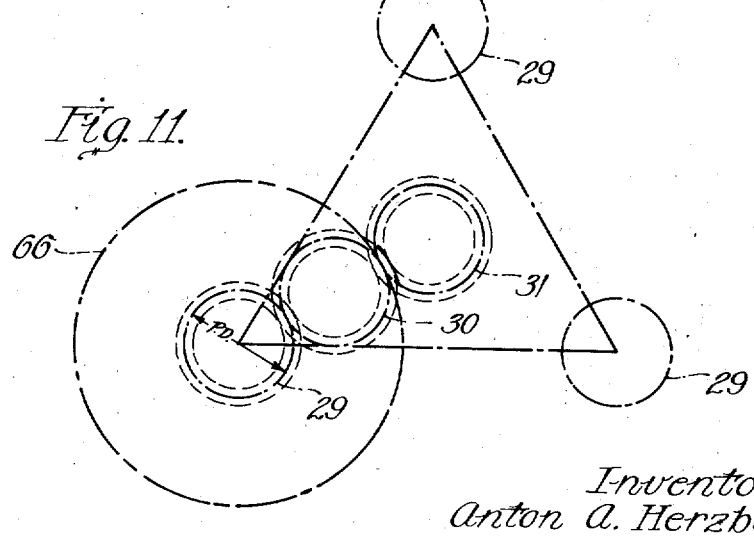
Figure 11 is a diagram illustrating the relation of one of the template openings to the corresponding take-off gear, and the manner of positioning the pinion of one of the gear assemblies to mesh with the take-off gear.
Figure 12:
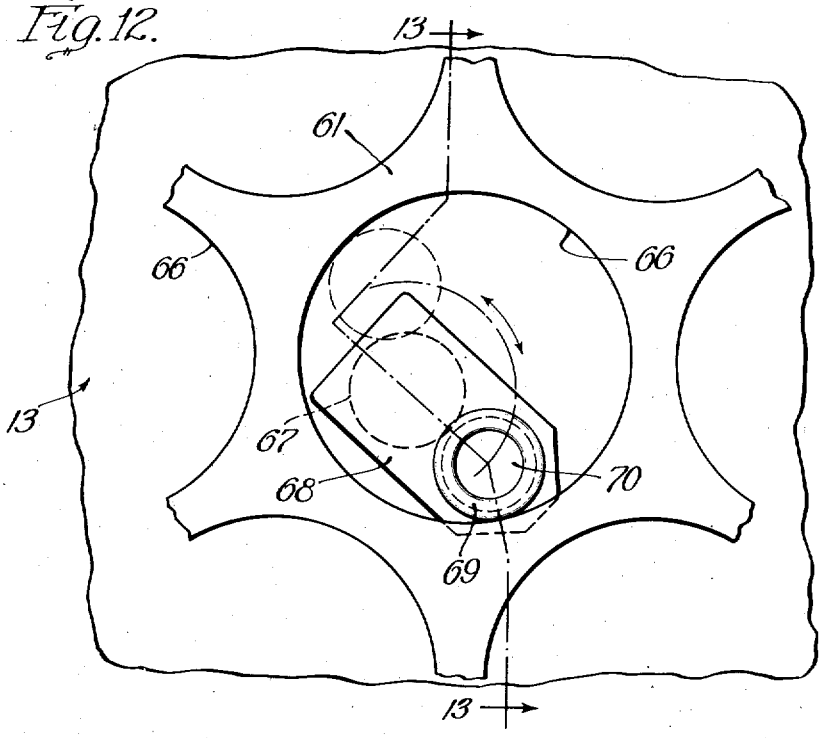
Figure 12 is a fragmentary detail, on an enlarged scale, of the template and a jig as applied to the spindle assembly supporting structure for positioning the pinion of a spindle assembly.
Figure 13:
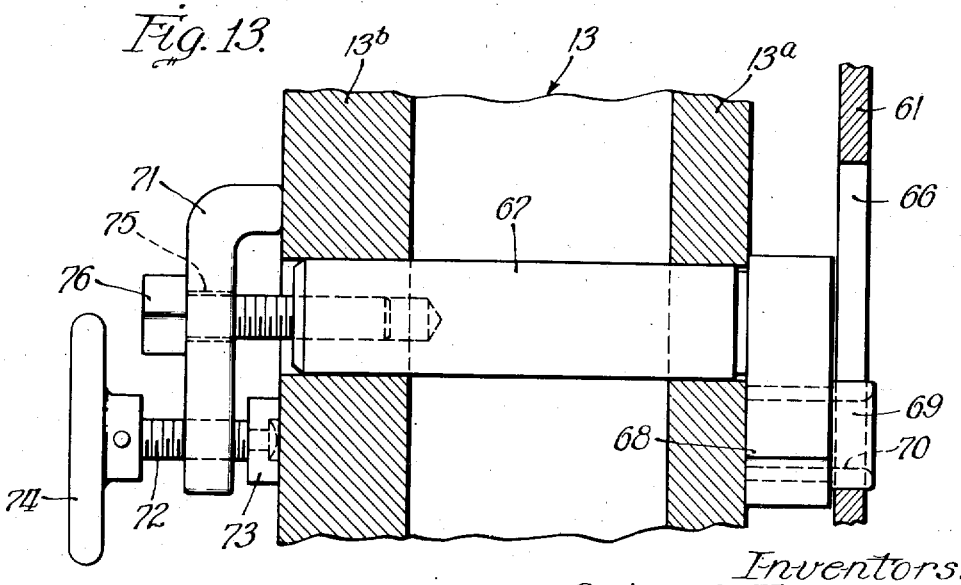
Figure 13 is a section taken substantially on line 13—13 of Figure 12.

The template is provided with a plurality of circular openings 66 extending through plate 61. These openings 66 are of a radius equal to one and one-half times the pitch diameter of the respective take-off gears 29, as indicated in Figure 11. The openings 66 of the template are so disposed that, with the template properly positioned upon the rearward or inner face of pattern plate 13 with the studs 63 inserted into openings 64, if the pattern plate 13, with the template mounted thereon, were disposed in operative relation to the casing section 12 the template openings 66 would be disposed concentrically with the respective take-off gears 29. Since the radius of the template openings 66 is equal to one and one-half times the pitch diameter of the take-off gears 29, and the take-off gears are of the same pitch diameter as the pinions 32 and the spindle gears 31, it follows that if the pinions of any selected spindle assembly be disposed within any one of the template openings 66 and in contact with the surrounding wall of such opening, this pinion will be disposed to mesh with the corresponding take-off gear when the pattern plate 13 is disposed in operative position upon the drill head.

To facilitate positioning of the pinions of the spindle assemblies, we provide a jig including a stub shaft 67 provided at one end with a radially projecting arm 68 from the face of which remote from stub shaft 67 extends a projection 69 of cylindrical shape and corresponding in pitch diameter to the pitch diameter of the respective pinions 30. The projection 69 and arm 68 are bored to provide an opening 70 to accommodate a suitable tool for spotting or marking the inner face of wall 13a of plate 13 to indicate thereon the proper positioning of the openings to be bored to accommodate the hubs 49 of stud shafts 50. Stub shaft 67 corresponds in diameter to the exterior diameter of spindle sleeve 33 and is adapted to be inserted through aligned openings bored through walls 13a and 13b of pattern plate 13 for reception of the spindle sleeve. After the pattern plate 13 has been suitably bored for reception of the spindle sleeves, in accordance with the work to be done, the shafts 67 of the jigs are inserted through the openings thus provided in plate 13 and are secured in position in a suitable manner. Conveniently, we provide clamping means each of which includes an angle member 71 which bears at one end against the outer face of wall 13b of plate 13. A pressure screw 72 threads through member 71 adjacent the other end thereof and is provided with a head 73 which bears against the outer face of wall 13b and is connected to the screw by a loose nut connection. For convenience in operating the screw a hand wheel 74 is suitably secured on the outer end thereof. Member 71 is provided intermediate the ends thereof with an opening 75 which accommodates a bolt 76, the head of which bears against the outer face of member 71, this bolt screwing into the outer end of stub shaft 67 which is suitably bored and threaded for this purpose. In practice, the number of jigs preferably corresponds to the number of spindle assemblies to be mounted upon the plate 13. After the jigs have been positioned properly upon plate 13, the template is then mounted upon the inner face of the pattern plate 13 which may conveniently be supported in inverted position in a suitable manner. At this time the jigs are not clamped tightly in position, the stub shafts 67 of the respective jigs being free to turn. Arms 68 of the respective jigs are then turned about the axis of the respective shafts 67, by turning the latter, so that the projection 69 of each of the jigs is brought into contact with the surrounding wall of an adjacent opening 66 of the template. Bolt 76 is then turned into shaft 67 so as to force the arm 68 tightly against the inner face of wall 13a thus clamping the jig tightly to plate 13 and effectively preventing movement of arm 68. The inner face of wall 13a is then marked to indicate the center point or axis of opening 7, by means of a suitable tool inserted through this opening. After the plate 13 has thus been marked to indicate the proper position of the axes of the pinions 32 to assure mesh thereof with the take-off gears 29, the template and the jigs may be removed, after which the walls 13a and 13b are suitably bored at the points indicated for reception of the hubs 49 of the stud shafts 50, and the bolts 52. The plate 13 is then ready for reception of the spindle assemblies. The sleeves 32 and the spindles carried thereby are then inserted through the sleeve receiving openings of plate 13, and hubs 49 of the stud shafts 50 are inserted through the adjacent openings through wall 13a, after which bolts are inserted through the corresponding openings of wall 13b and are screwed into the hubs 49. In this manner the spindle assemblies are secured in position upon plate 13 and the pinions 30 of such assemblies are accurately positioned to assure mesh thereof with the corresponding take-off gears 29.

For each new job it is only necessary to make up a new pattern plate 13, and proper mesh of the pinions of the spindle assemblies mounted upon this plate with the take-off gears is assured in any position of the spindles upon plate 13. This avoids all necessity for making up a new gear assembly for each new job, as is the present practice, thus effecting a material saving in time and cost. In this connection, it is to be noted that the guide studs 65, and the openings 64 of the pattern plate, assure that all of the pattern plates for use on any given head will be accurately positioned thereon in similar and predetermined relation to the head. Also, the guide studs 63 of the templates cooperate with openings 64 of the pattern plates to assure that the templates will be accurately positioned upon each of the pattern plates for use with a given head in similar and predetermined relation to such pattern plate, such template when so positioned bearing a definite and predetermined relation to the take-off gears or drive members 29, as previously explained.

Figure 14:
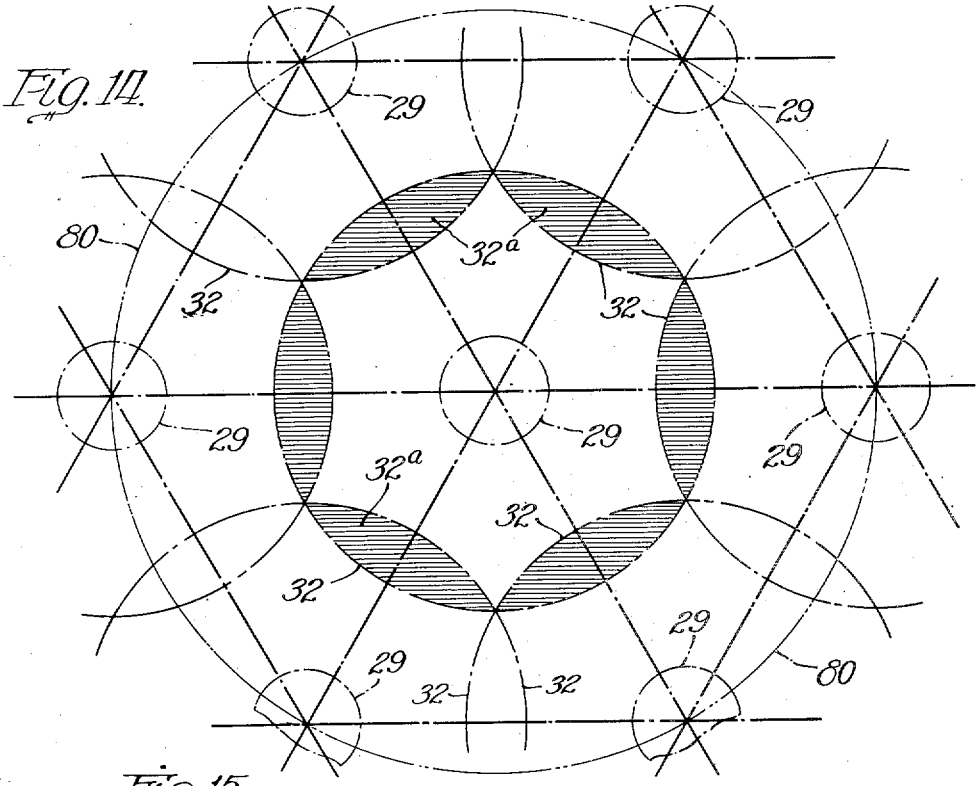
Figure 14 is a diagram illustrating the overlap of the effective areas of the respective take-off gears when triangular arrangement thereof is employed.
Figure 15:
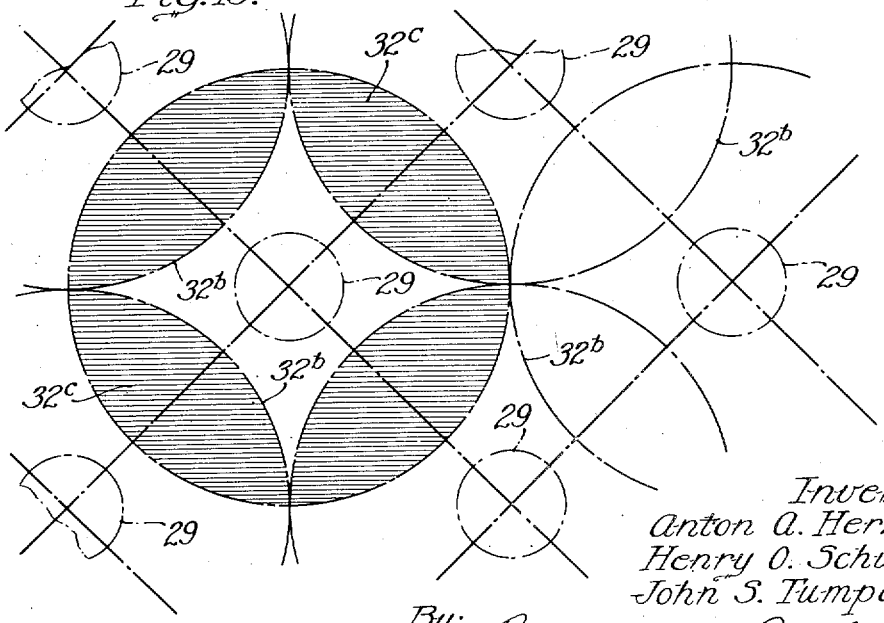
Figure 15 is a diagram illustrating the overlap of the effective areas of the respective take-off gears when quadrangular arrangement thereof is employed.

With the triangular arrangement of the take-off gears, such gears may be considered as disposed in contiguous groups of seven, each group comprising a central gear and six outer gears disposed so that the axes thereof define a regular hexagon, this hexagon comprising six equilateral triangles, as shown in Figure 14. The hexagon is inscribed within a circle 80 having a radius equal to one side of the respective triangles. As previously noted, the effective areas of the take-off spindles, indicated by the circles 32 overlap, the area of this overlap being indicated at 32a in Figure 14. We also contemplate arranging the take-off gears so as to define regular geometric figures other than triangles. In Figure 15 we have indicated, diagrammatically, the arrangement of the take-off gears 29 in such manner that the axes of any four adjacent gears define an equilateral quadrilateral or square. With this arrangement of the gears it will be noted that the area of overlap 32c of the effective areas of the respective gears, indicated by the circles 32b, is much greater than the area of overlap when the take-off gears are disposed in triangular arrangement. This means that when the gears are disposed to define squares, a greater number of gears is required than where they are disposed to define triangles. We prefer, therefore, to dispose the gears in the triangular arrangement previously described, though our invention comprehends, in its broader aspect, any suitable or preferred geometric arrangement of the take-off gears to accomplish the desired results.

In the preferred embodiment of our invention, we have used the pitch diameter of the respective take-off gears as the basis for determining the spacing thereof, the spindle gears and the pinions meshing therewith being of the same pitch diameter as the take-off gears. This particular relation between the gears and the spindles is not essential in all cases, however, and the pitch diameter thereof may be varied within limits so long as a gear spindle at the center of the geometric figure may be operatively connected by an intermediate pinion to one of the take-off gears at an angle of that figure. Referring to Figure 8, and as previously noted, the distance from the center point of the triangle defined by the axes of three adjacent take-off gears 29, and the nearest points on the pitch circles of these gears, is such that the pinion may be positioned to mesh with at least one of the gears in any position of the spindle axes within the triangle or on any side thereof. Since the take-off gears and the spindle gears and pinions are all of the same pitch diameter, in the preferred embodiment of our invention illustrated, this distance is equal to one and one-half times the pitch diameter of the respective gears. It is to be noted, however, that this distance may be varied within considerable limits. In example, if the distance from the axis of the spindle gear to the most remote point on the pitch circle of the pinion meshing with such gear is equal to the distance from the center of the triangle to the nearest point on the pitch circle of the respective take-off gears defining the triangle, proper mesh of the pinion with at least one of the take-off gears is assured in any position of the axis of the spindle gear within the triangle or on any side thereof, as before. It is thus apparent that the diameters of the gears and pinions may be varied within considerable limits, to suit conditions, so long as the pitch diameters of the take-off gears, intermediate pinions and spindle gears enable the axis of the spindle gear to be placed at the point most remote from the take-off gears, which is the center of the geometrical figure formed by the take-off gears. This rule holds true whether the take-off gears are disposed in triangular arrangement, or in any other suitable or preferred manner to define geometric figures suitable for accomplishing the desired results.

Figure 6:
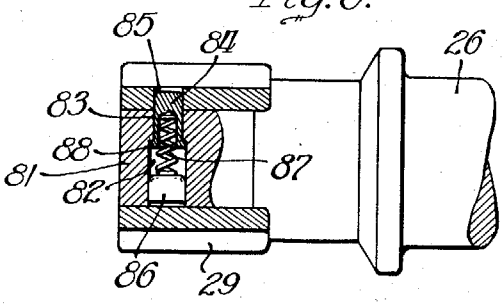
Figure 6 is a detail view, partly broken away and in section, of one of the take-off gears and the mounting therefor.

In Figure 6 we have shown one of the take-off gears 29 removably mounted upon its associated stub shaft 26. The forward end of this shaft is reduced to provide a neck 81 for reception of gear 29. This neck is provided with a diametrically extending bore 82 from which extends a bore 83 of reduced diameter. A locking plunger 84 is slidably mounted through bore 83, the outer portion of this plunger engaging into a bore 85 in gear 29. A stop plug 86 is suitably secured in bore 82, as by being a drive fit therein. An expansion coil spring 87 is confined between this plug and the nose portion of plunger 84, which is bored from its inner end to provide a recess which receives the spring. Outward movement of plunger 84 is limited by a shoulder 88 at the inner end thereof which contacts a corresponding shoulder at the inner end of bore 82. Gear 29 fits snugly about neck 81 and seats, at its outer end, on a shoulder formed on shaft 26 at the inner end of neck 81. The plunger 84 may be moved inwardly into bore 83, by any suitable instrument inserted through bore 85, thus permitting of the gear 29 being removed from neck 81. This provides efficient but simple means for effectively locking the gear in position upon neck 81 of shaft 26, while permitting removal and replacement of the take-off gears as conditions may require. In this manner, gears of proper diameter for the work to be done can be placed upon the stub shafts 26 with facility and can be removed quickly and with equal facility for replacement, repairs or other purposes.

Figure 7:
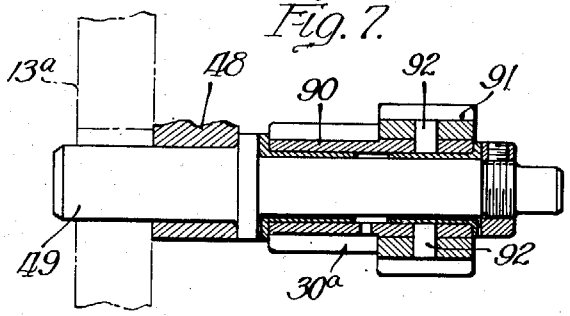
Figure 7 is a detail view, partly in section, of a modified form of idler pinion for driving the spindles, and the mounting therefor.

In Figure 7, we have illustrated a modified form of spindle assembly pinion 38. This pinion comprises an outer portion 90 and an inner portion 91 of greater diameter than the outer portion and secured thereto in a suitable manner, as by means of pins 92. This pinion gives a speed reduction drive from the take-off gear 29 with which section 91 of the pinion meshes, to the spindle gear with which section 90 of the pinion meshes. In the construction illustrated in Figure 5, the spindle 36 is driven in the same direction and at the same speed as the take-off gear 29. In a spindle assembly using the pinion of Figure 7, the spindle would be driven in the same direction as the take-off gear with which section 91 of the pinion meshes, but at a lower speed than such take-off gear. By employing take-off gears of different diameters, or using compound pinions, the spindles can be driven at any desired speed within limits. In any case, the gears and pinion must enable a spindle gear located at the center of the geometric figure defined by the take-off gears to be connected by the pinion to one of the take-off gears. In the particular arrangement illustrated for driving the take-off gears, the pinion 20 and the gear 21 provide a suitable speed reduction drive between shaft 16 and countershaft 22. Any other suitable or preferred means may be provided for driving the countershaft 22 and any suitable means other than the particular means illustrated may be employed for transmitting rotation to the take-off gears.

In the preferred form of our invention, the spindles are driven from the take-off members or gears by pinion and gear means. In its broader aspects, however, our invention comprehends any other equivalent driving means for the spindles.

While we have illustrated and described our invention as applied to a multiple drill head, by way of example, it is not in any way restricted to this one use, since it is also well adapted for analogous devices and, in its broader aspects, is applicable to any type of head where it is desired to provide a multiple point take-off from a common source of power. Also, we contemplate the use of one or more spindles in the respective spindle assemblies, as conditions may require.

What we claim is:

1. In a mechanism of the character described, a plurality of take-off gears arranged in two series of rows, the rows of one series being substantially perpendicular to the rows of the other series, and the gears being equally spaced and arranged in a series of geometric figures, a pattern plate in advance of the gears, tool-receiving spindles on the pattern plate, gears secured on the respective spindles, and pinions meshing with the spindle gears and positionable about the spindle axes in the mounting of the spindles on the plate, the distance between the pitch circles of each take-off gear and the center of an adjacent figure not exceeding the radius of a spindle gear and the pitch diameter of the associated pinion, whereby any spindle gear having a center within said figure may be operatively connected with one of the take-off gears defining said figure, by means of one of said pinions.

2. In a mechanism of the character described, a plurality of take-off gears, a pattern plate in advance of the gears, said gears being equally spaced and arranged in parallel rows inclined transversely of the plate, said gears being arranged in a series of geometric figures, tool-receiving spindles mounted on the plate, gears secured on the inner ends of the respective spindles, and pinions meshing with the spindle gears and take-off gears, the distance between the center of each figure and any angle thereof not exceeding the sum of the pitch radius of a spindle gear, the pitch diameter of a pinion and the pitch radius of a take-off gear, whereby a pinion may be disposed on the pattern plate to mesh with one of the take-off gears and with a spindle gear on the plate located within a geometric figure associated with said take-off gear.

3. In a mechanism of the character described, a plurality of equally spaced take-off gears arranged in a geometric figure pattern, a plate in advance of the gears, tool receiving spindles mounted on the plate, spindle gears disposed outwardly beyond the take-off gears, and pinions meshing with the spindle gears and extending inwardly beyond the spindle gears for meshing with said take-off gears, the spindle gears and take-off gears and pinions being of such pitch diameter in relation to the distance between the center of a figure to its angles that a spindle gear at said center may be operatively connected to a take-off gear at any of said angles by means of a pinion.

4. In a mechanism of the character described, a support including a gear plate, a plurality of stub shafts rotatably mounted through the plate, take-off gears secured on the stub shafts, said gears being disposed in non-meshing relation and equally spaced one from the other with the spaces therebetween unobstructed, a removable pattern plate in advance of the gear plate, tool-receiving spindles mounted through the pattern plate, and pinions having driving connection to the respective spindles, the pinions being eccentric to the spindles and extending into the plane of the gears, said pinions being connected to the spindles for movement thereabout prior to final mounting of the spindles in the pattern plate for mounting the pinions for mesh with the gears.

5. In a mechanism of the character described, a support including a gear plate, a plurality of stub shafts rotatably mounted through the plate, take-off gears secured on the stub shafts and disposed in a pattern of similar unobstructed geometric figures, a removable pattern plate in advance of the gear plate, tool-receiving spindles mounted on the pattern plate, gears secured on the inner ends of the respective spindles, and pinions eccentric to and meshing with the spindle gears and connected to the respective spindles for movement about the spindle axis prior to the final mounting of the spindles on the pattern plate, the sum of the pitch radius of a spindle gear and the pitch diameter of a pinion being at least equal to the distance between the pitch circle of a take-off gear and the center of an associated figure, whereby a spindle may be mounted on any center within said figure and brought into operative connection with one of the take-off gears defining that figure by means of a pinion.

6. In a mechanism of the character described, a support including a gear plate, a plurality of stub shafts rotatably mounted through the plate, take-off gears secured on the stub shafts and disposed in equally spaced relation with a geometric figure pattern, each figure being unobstructed, a removable pattern plate in advance of the gear plate, tool-receiving spindles mounted on the pattern plate, gears secured on the inner ends of the respective spindles and disposed outwardly beyond the take-off gears, and pinions meshing with the spindle gears and extending inwardly therebeyond for meshing with the take-off gears, said pinions being in eccentric relation to the spindles, the distance between the pitch circle of one of the take-off gears and the center of an adjacent figure being such that a spindle gear having its center at the center of said figure may be operatively connected to said take-off gear.

7. In a mechanism of the character described, a plurality of non-meshing take-off gears disposed in spaced geometric arrangement to provide a series of contiguous equilateral polygons, the space within the respective polygons being unobstructed, a pattern plate in advance of the gears, tool-receiving spindles mounted on the pattern plate, gears secured on the inner ends of the respective spindles and pinions in eccentric relation to and meshing with the spindle gears, the distance between the pitch circle of any take-off gear and the center of the polygon not exceeding the sum of the pitch radius of the spindle gear and the pitch diameter of the associated pinion whereby a spindle gear may be centered at any point within the polygon and operatively connected to one of the take-off gears by means of a pinion.

8. In a mechanism of the character described, a plurality of non-meshing take-off gears disposed in spaced geometric arrangement to provide a series of contiguous equilateral triangles, the space within the respective triangles being unobstructed, a pattern plate in advance of the gears, tool-receiving spindles mounted on the pattern plate, gears secured on the inner ends of the respective spindles, and pinions meshing with the spindle gears and with the take-off gears, the distance between the pitch circles of any two adjacent take-off gears being within $$\sqrt{3}D_I+\frac{\sqrt{3}}{2}D_S-(1-\sqrt{3})D_T$$

where $D_I$ is the pitch diameter of the intermediate pinion, $D_S$ is the pitch diameter of the spindle gear and $D_T$ is the pitch diameter of the take-off gear.

9. In a mechanism of the character described, a plurality of equally spaced take-off gears defining an equilateral triangle, a pattern plate in advance of the gears, tool-receiving spindles mounted in the plate, gears, secured on the inner ends of the spindles, and pinions meshing with the respective spindle gears and adjustable about the spindle axes prior to the final mounting of the spindles in the plate, the space within the triangle being free for reception of the spindle gears and pinions and the distance between the centers of any two adjacent take-off gears not exceeding $$\sqrt{3}\left(\frac{1}{2}D_T+D_I+\frac{1}{2}D_S\right)$$

where $D_I$ is the pitch diameter of the intermediate pinion, $D_S$ is the pitch diameter of the spindle gear and $D_T$ is the pitch diameter of the take-off gear.

10. In a mechanism of the character described, a plurality of equally spaced take-off gears defining an equilateral triangle, a pattern plate in advance of the gears, tool-receiving spindles mounted in the plate, gears secured on the inner ends of the spindles, and pinions meshing with the respective spindle gears and adjustable about the spindle axes prior to the final mounting of the spindles in the plate, the space within the triangle being free for reception of the spindle gears and pinions and the distance from the center of the triangle to the pitch circles of the respective take-off gears being within the pitch radius of the spindle gear plus the pitch diameter of the spindle pinion.

ANTON A. HERZBERG.
HENRY O. SCHULTZ.
JOHN S. TUMPAK.